United States Patent [19]

Neebel

[11] Patent Number: 4,823,868
[45] Date of Patent: Apr. 25, 1989

[54] INTERCOOLER AND METHOD OF ASSEMBLING THE SAME

[75] Inventor: Dennis R. Neebel, Corvallis, Oreg.

[73] Assignee: Deere & Company, Moline, Ill.

[21] Appl. No.: 198,884

[22] Filed: May 26, 1988

[51] Int. Cl.⁴ .................... B22C 13/10; F02B 33/00
[52] U.S. Cl. ......................... 165/178; 29/157.3 R;
              60/599; 123/563; 285/910; 165/51
[58] Field of Search ............. 165/41, 51, 157, 178;
       60/599; 123/563; 285/137.1, 910; 29/157.3 R,
                                            157.3 A, 157.4

[56] References Cited

U.S. PATENT DOCUMENTS

| 3,881,455 | 5/1975 | Belsanti | 123/563 |
| 4,191,244 | 3/1980 | Keske | 285/137.1 |
| 4,436,145 | 3/1984 | Manfredo et al. | 60/599 |
| 4,476,842 | 10/1984 | Belsanti | 123/563 |
| 4,562,697 | 1/1986 | Lawson | 123/563 |

OTHER PUBLICATIONS

John Deere Parts Manual, pp. 1E15–1E16, Dec. 9, 1987.

Primary Examiner—Samuel Scott
Assistant Examiner—Noah Kamen

[57] ABSTRACT

An intercooler has a highly compressible seal pressed between an inside surface of the intercooler housing and core. The seal has a peripheral bead and is made of silicone.

10 Claims, 3 Drawing Sheets

Fig. 2
Fig. 3
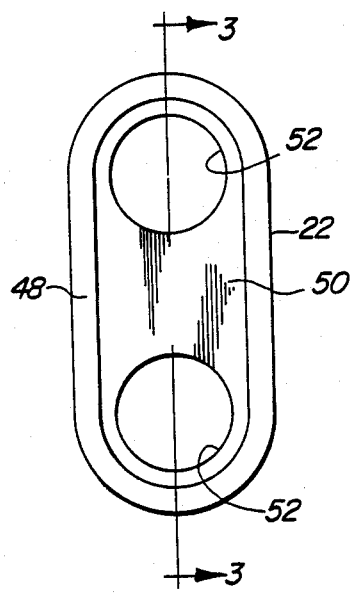
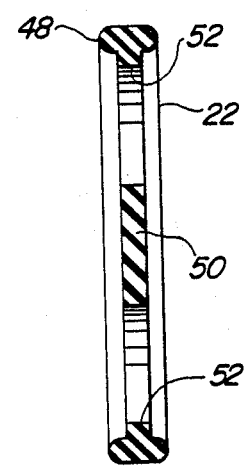

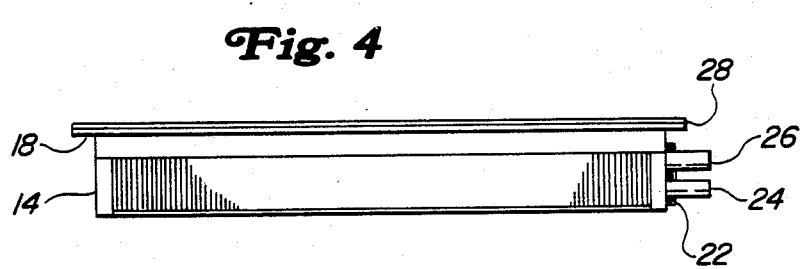
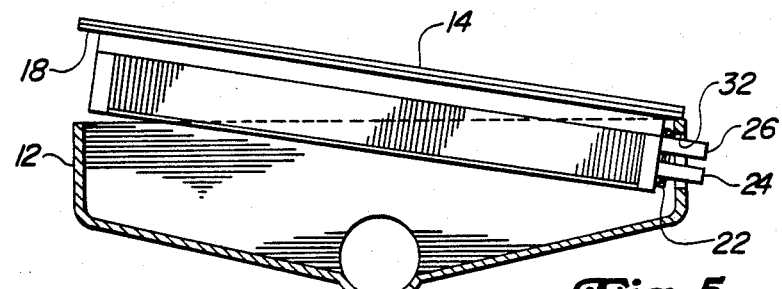
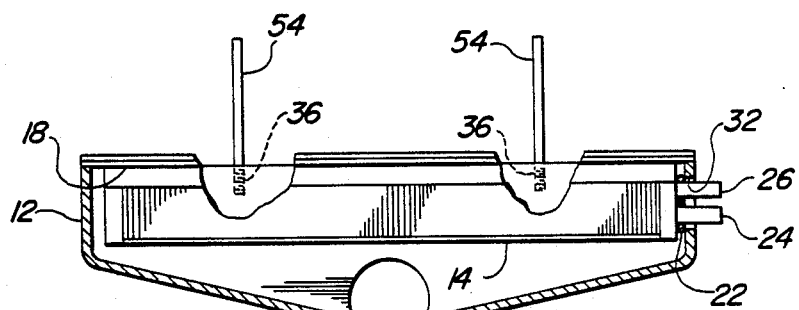
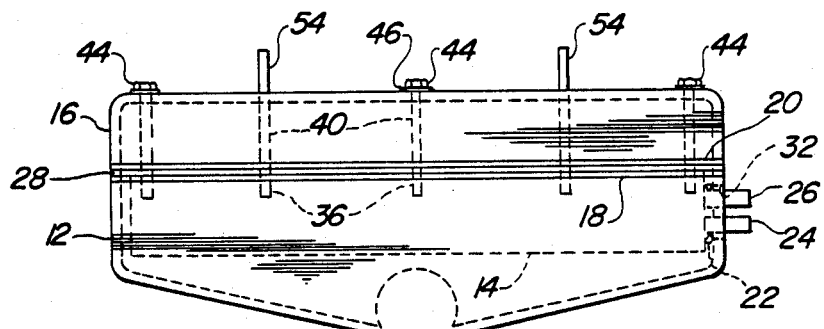

INTERCOOLER AND METHOD OF ASSEMBLING THE SAME

BACKGROUND OF THE INVENTION

1. Field of the Invention

The present invention relates to a seal for use with an intercooler on a turbo-charged engine, and to a method of assembling the intercooler. The method of assembling the intercooler applies pressure to the seal, which in turn allows the seal to form a tight seal with an unfinished, cast surface of the intercooler cover.

2. Description of the Related Art

Turbo-charged and super-charged engines use a turbocharger or supercharger to increase the power output of a particular engine by compressing the air drawn into the engine. As air is compressed in this fashion, it becomes heated. Since air is denser at lower temperatures, the air density can be increased even further if it is cooled following compression. For maximum compression, the air therefore is first compressed by a turbocharger or supercharger, and then cooled before it is injected into the intake manifold of the engine. To do this, the air is fed past an intercooler, sometimes called an aftercooler, before it is fed into the engine.

In essence, an intercooler is simply a particular type of heat exchanger. The intercooler core normally is formed by one or more tubes carrying a coolant, with a plurality of fins extending from the tubes. The compressed air from the turbocharger or supercharger then is forced past these fins before entering the engine intake manifold.

Numerous intercooler designs are known. All such designs require that the housing of the intercooler, which surrounds the intercooler core, be substantially air-tight so that the compressed air is forced to flow through the fins of the intercooler and does not escape through the housing. Unfortunately, prior designs for sealing the intercooler core in the housing have been rather complex.

For example, the intercooler used on John Deere 4650 and 4850 Tractors uses an intercooler core with a coolant inlet at one end and a coolant outlet at the other end. O-rings are provided on the inlet and the outlet to aid in sealing. However, these O-rings are not sufficient by themselves and separate adapters and gaskets also are required, as well as screws to hold them on. The result is that approximately 14 pieces are needed simply to seal the inlet and outlet of the intercooler core. While the system works, it is rather complicated to assemble.

Another example is shown in U.S. Pat. No. 3,881,455 (Belsanti). The Belsanti reference uses two gaskets on each side of the input end of the intercooler core. The gaskets and intercooler core are clamped between an inlet chamber piece and the intercooling housing proper by several screws. Again, a number of pieces are required to seal the inlet.

SUMMARY OF THE INVENTION

It is the purpose of the present invention to provide a sealing mechanism for sealing the coolant inlet and outlet of an intercooler core to the intercooler housing using a minimum of parts. It is a further purpose of the invention to provide such a seal which can be used between cast surfaces, that is, surfaces which have not been machined to a fine finish or provided with a groove or the like for engagement by the seal. It is a further purpose of the present invention to provide a method of assembling the intercooler which will properly position such a seal.

These purposes are accomplished according to the present invention with a highly compressible seal and an intercooler core having its inlet and outlet at the same end. The intercooler housing has a single opening at one end thereof through which the inlet and the outlet for the intercooler core extend. The seal is placed over the intercooler coolant inlet and outlet. The core then is pressed against the inside of the housing so that the seal is compressed. This forms a tight seal between the housing and the core. The seal preferably has a central web with openings therein corresponding in size and position to the inlet and outlet of the intercooler core.

A preferred method for assembling such an intercooler core and housing is to position the seal over the inlet and outlet of the intercooler core. The intercooler then is placed into the housing cover and pressed against the end thereof to compress the seal. Pins are screwed into the cover through the intercooler core to hold the intercooler core pressed against the intercooler housing. This assembly then is placed on the intake manifold, cap screws are inserted to hold the cover to the intake manifold, and the pins may be removed. Additional cap screws are then placed in the positions once occupied by the pins.

The result is a very simple structure in which only a single piece, namely the seal, is used to seal the intercooler housing. The seal itself preferably is formed with a bead around the rim thereof to provide adequate material to seal the housing upon compression. The seal must be formed of a high compressibility material, preferably silicone. For sealing against a rough, cast surface with a variation of about 2.5 milimeters, this bead should have a minimum compressibility of about 40% without rupturing to provide an adequate seal.

BRIEF DESCRIPTION OF THE DRAWINGS

FIG. 2 is a detailed plan view of the seal used in the intercooler of FIG. 1.

FIG. 3 is a cross-sectional view along the line 3—3 in FIG. 2.

FIGS. 4–7 depict various steps in the preferred method of assembly for the intercooler of FIG. 1.

DETAILED DESCRIPTION OF THE PREFERRED EMBODIMENTS

Figure 1:
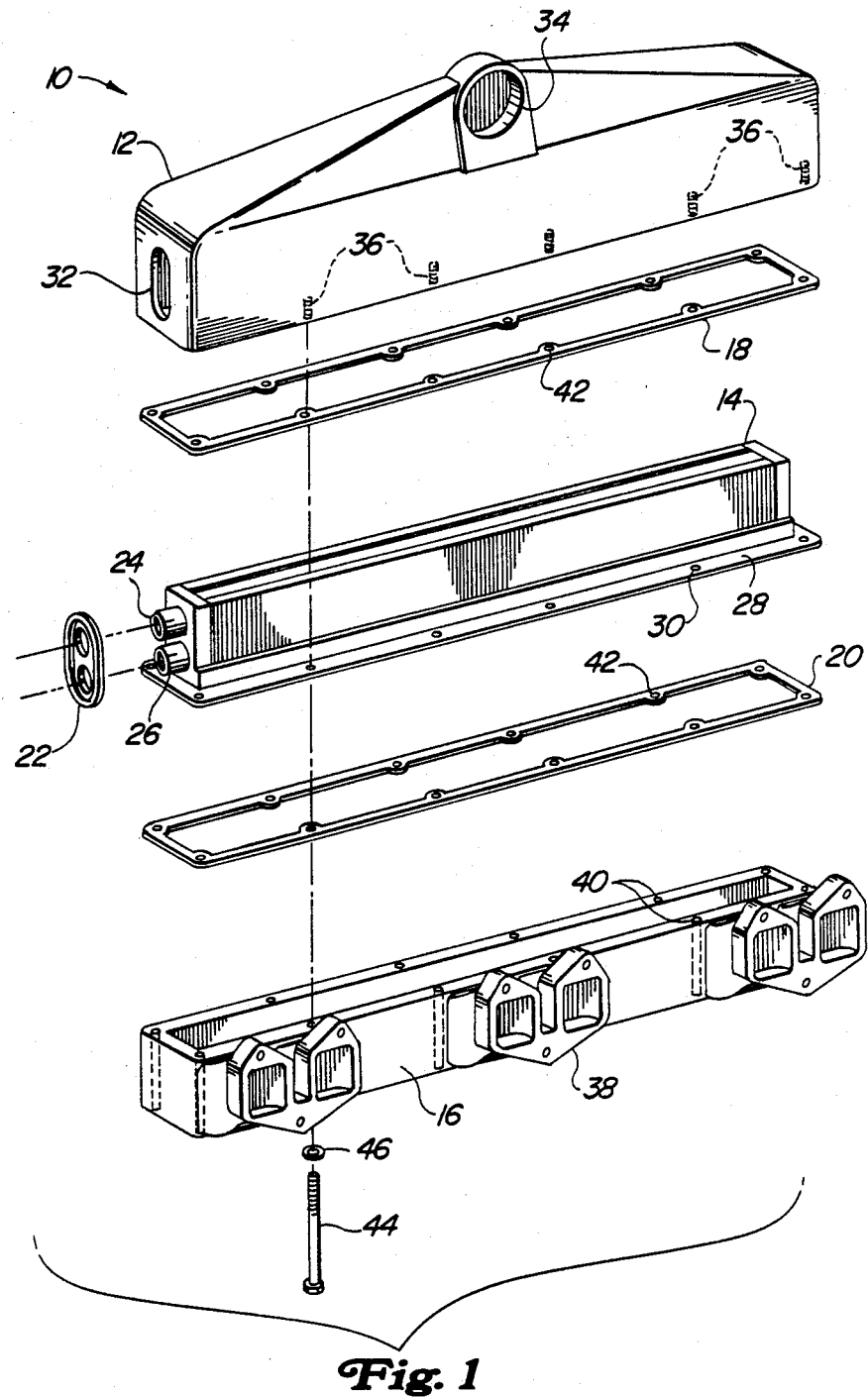
FIG. 1 is an exploded view of an intercooler according to the present invention.

Referring to FIG. 1, the intercooler 10 is formed by an intercooler housing 12, an intercooler core 14, an intake manifold 16, two gaskets 18, 20 and an intercooler seal 22. The intercooler core 14 has an inlet 24 and an outlet 26 disposed at one end thereof. In use, the inlet 24 and outlet 26 are connected to an appropriate supply of coolant. The intercooler core 14 also has a support flange 28 extending around the periphery thereof, with a plurality of holes 30 spaced about the flange 28.

The intercooler cover 12 has an opening 32 through which the inlet 24 and outlet 26 of the intercooler 14 can extend. It also has an air inlet 34 for receiving air from the turbocharger or supercharger (not shown), and a plurality of screw bores 36 in the base thereof at positions corresponding to the positions of the holes 30 in the intercooler core 18.

The intake manifold 16 has a plurality of air outlets 38 for connection to the air intake of an engine, and a plurality of through bores 40 aligned with the holes 30 in flange 28.

Gaskets 18, 20 are sized to match the flange 28 and have a plurality of holes 42 aligned with the holes 30 in the flange 28.

As will be readily apparent, upon assembly a plurality of cap screws 44 can extend through each of the through bores 40 and holes 30, 42 into the screw bores 36 to clamp the intercooler cover 12, gaskets 18, 20 and intercooler core flange 28 to the intake manifold 16, providing a tight seal therebetween. Preferably, the cap screws 44 are provided with mounting washers 46, as illustrated. For clarity of illustration, only one screw 44 and washer 46 are shown, although it should be understood that there would be one screw 44 and washer 46 corresponding to each set of bores 36, 40 and holes 30, 42.

Referring to FIGS. 2 and 3, the seal 22 generally matches the opening 32 in shape, which in this case means that it is rather elliptical. The outer edge of the seal 22 is formed as bead 48. The inside of the seal 42 has a web 50 extending thereacross with holes 52 corresponding in size and position to the inlet 24 and outlet 26 of the intercooler core 14. The seal 22 is formed of a highly compressible material, e.g., silicone. The bead 48 is sized such that upon compression of the seal 42, the bead 48 will spread and provide an ample seal. The precise sizing of the bead 48 of course depends upon the roughness of the surface being sealed. With a typical cast surface having a clearance variation of about 2.5 milimeters, the bead 48 must have a minimum compressibility of about 40% without rupturing to provide an adequate seal.

While the intercooler 10 according to the present invention can be assembled in any fashion which would provide adequate pressure to compress the seal 22, the following method is preferred:

Referring to FIG. 4, the gasket 18 is placed over the top of the intercooler core 14 so as to rest on the flange 28 with the holes 30, 42 aligned. The seal 22 then is placed over the inlet 24 and outlet 26 of the intercooler core 14. The holes 52 in the seal 22 should properly position the seal 22 on the intercooler core 14.

As shown in FIG. 5, this assembly is placed into the intercooler housing 12, with the inlet 24 and outlet 26 extending through the opening 32 in the housing 12. The intercooler 14 then is pressed towards the end of the intercooler housing 12 having the opening 32, thereby to compress the seal 22.

As shown in FIG. 6, assembly pins 54 are inserted through holes 30, 42 and screwed into screw bores 36 to hold the intercooler core 14 properly positioned relative to the intercooler housing 12.

Referring to FIG. 7, this assembly in turn is placed on the gasket 20 and intake manifold 16, with the pins 54 extending through corresponding holes 42 in the gasket 20 and through bores 40 in the intake manifold 16. Cap screws 44 then are inserted through through bores 40 and holes 30, 42 into screw bores 36 and tightened to clamp the entire assembly together and form an air-tight seal. Pins 54 are then removed, and replaced by additional cap screws 44.

As may be seen, the entire intercooler is designed with a minimum of parts. This results in savings in both the cost for the parts and the time required to assemble the structure.

While the present invention has been described with reference to a particular embodiment, it is to be understood that numerous modifications could be made thereto without departing from the present invention. For example, while one inlet 24 and one outlet 26 have been shown herein, additional pipes could be provided. Similarly, the inlet and outlet could be provided in a single, divided pipe. The seal 22 also could be used in an intercooler held together in some fashion other than that described, provided only that it maintains adequate pressure on the seal 22. Accordingly, it is intended that the scope of the invention be limited only by the following claims.

I claim:

1. An intercooler comprising:
   an intercooler core having an inlet, an outlet, and a flange peripherally extending therefrom with a plurality of holes spaced around said flange;
   first and second gaskets positioned on either side of said flange, each gasket having a plurality of holes corresponding to the plurality of holes in said flange;
   a housing having a face mateable with said first gasket with a plurality of screw bores formed therein corresponding to said holes in said flange and having an opening formed in one end thereof through which said inlet and said outlet extend;
   an intake manifold having a face mateable with said second gasket and a plurality of through bores formed therein corresponding to said bores in said flange;
   a plurality of cap screws extending through said through bores and holes into said screw bores for clamping said housing, gaskets, flange and manifold together to form an air-tight seal therebetween; and
   a highly compressible intercooler seal positioned about said inlet and outlet and compressed between said intercooler core and an inside surface of said housing about said opening to form a seal therebetween.

2. The intercooler of claim 1, wherein said seal comprises a bead extending around the outer circumference thereof and a web extending across the center thereof and having two holes formed therein, said holes corresponding in size and position to the size and position of said inlet and outlet.

3. The intercooler of claim 2, wherein the portion of said housing against which said seal is pressed is a cast surface.

4. The intercooler of claim 3, wherein said cast surface has a clearance variation of about 2.5 milimeters.

5. The intercooler of claim 4, wherein said bead of said seal has a compressibility of at least 40% without rupturing.

6. The intercooler of claim 5, wherein said intercooler seal is formed of silicone.

7. The intercooler of claim 6, wherein said housing has an air inlet formed therein and said intake manifold has a plurality of air outlets formed therein.

8. A method of assembly an intercooler which comprises:
   an intercooler core having an inlet, an outlet, and a flange peripherally extending therefrom with a plurality of holes spaced around said flange;
   first and second gaskets positioned on either side of said flange, each gasket having a plurality of holes corresponding to the plurality of holes in said flange;

a housing having a face mateable with a said first gasket with a plurality of screw bores formed therein corresponding to said holes in said flange and having an opening formed in one end thereof through which said inlet and said outlet extend;

an intake manifold having a face mateable with said second gasket and a plurality of through bores formed therein corresponding to said bores in said flange;

a plurality of cap screws extending through said through bores and holes into said screw bores for clamping said housing, gaskets, flange and manifold together to form an air-tight seal therebetween; and a highly compressible intercooler seal positioned about said inlet and outlet and compressed between said intercooler core and an inside surface of said housing about said opening to form a seal therebetween; the steps of assembly comprising:

positioning said first gasket on said flange;

positioning said seal on said inlet and said outlet;

positioning the intercooler core, gasket and seal assembly in said housing;

pressing said intercooler core towards the end of said housing having said opening, thereby to compress said seal;

inserting assembly pins through said holes in said flange and first gasket into said screw bores, thereby to hold said intercooler core in a position compressing said seal;

placing the intercooler core, gasket, seal, housing and assembly pin assembly on said second gasket and intake manifold with said assembly pins extending through said holes in said second gasket and said through bores properly to position the same relative to said assembly; and inserting the cap screws through said holes and through bores into the screw bores which are not occupied by said assembly pins and tightening the same to clamp said intercooler together.

9. The method of claim 8, comprising the further step of removing the assembly pins.

10. The method of claim 9, comprising the further step of replacing the removed assembly pins with additional cap screws.

* * * * *